United States Patent [19]

Yang et al.

[11] 4,188,613
[45] Feb. 12, 1980

[54] SAFETY INDICATOR FOR AUTOMOBILE BRAKING SYSTEM

[76] Inventors: Chieh-Pang Yang, No. 28, Chang Cheng Rd.; Chia-Hsiang Wong, No. 314, Chang Cheng Rd., both of Kuong Fu Hsiang, Hualien Hsien, Taiwan

[21] Appl. No.: 911,067

[22] Filed: May 31, 1978

[51] Int. Cl.² .................................. G08B 21/00
[52] U.S. Cl. .................... 340/52 A; 340/52 B; 200/61.4
[58] Field of Search ............ 340/52 A, 52 B, 69; 200/61.4, 61.42, 61.44

[56] References Cited

U.S. PATENT DOCUMENTS

| | | | |
|---|---|---|---|
| 3,297,985 | 1/1967 | Trebonsky et al. | 340/52 A |
| 3,479,640 | 11/1969 | Puma | 340/52 A |
| 3,805,228 | 4/1974 | Peeples | 340/52 A |

Primary Examiner—Alvin H. Waring
Attorney, Agent, or Firm—Blair, Brown & Kreten

[57] ABSTRACT

An indicator for evaluating the condition of a brake system defined by a pair of conductors operatively connected to an indicator bulb circuit embedded within the brake lining. One conductor shows when the lining touches the brake drum while the second conductor shows when the lining is excessively thin. The conductor's alignment in the lining is adjustable.

1 Claim, 3 Drawing Figures

SAFETY INDICATOR FOR AUTOMOBILE BRAKING SYSTEM

OBJECTS OF THE INVENTION

An object of the invention is to provide a device which will exactly indicate the condition of the braking system of a vehicle with a simple operation prior to driving.

Another object of the invention resides in its use in checking the degree of wear on brake linings so that repair of the braking system or replacement of brake linings can be done in appropriate time in order to prevent damage and accidents due to breakdown of the braking system.

BACKGROUND OF THE INVENTION

The automobile has been a very important transportation vehicle for mankind. However, traffic accidents happen too frequently, the reason for which may be the breakdown of the braking system as well as the negligence of men. Since a braking system is installed underneath an automobile, there has not been any simple, fast and reliable manner to detect whether the brake lining is workable except by periodic inspections. Furthermore, since one's driving mannerisms may be different from that of others, prevention of accidents by means of periodic inspections may not be completely effective. The invention herein provides an effective way to resolve the above problem.

SUMMARY OF THE INVENTION

The invention utilizes the opening and closing of a circuit so that a driver will know the safety condition of a braking system from the light of indicators.

The invention is comprised of four sets of conductor bars, each set consisting of a long and a short bar, which are placed in the brake linings of each wheel respectively. The contact terminal of the longer conductor bar is on a level with the functional surface of the brake lining. When the brake pedal is pressed, the longer conductor bar contacts the brake drum. Then, a closed circuit is formed with the car body acting as a conductor and thus, the indicator flashes. When the brake is released, the indicator extinquishes. This operation shows that the braking system is normal. Otherwise, there must be trouble in the braking system, whereupon inspection and repair should be made forthwith.

The above mentioned shorter conductor bar is installed within the brake lining at a considerable distance away from the functional surface. As soon as the brake lining is worn up to the level of the shorter contact terminal, a closed circuit is formed and the indicator flashes to warn the driver that replacement of brake linings is in order to prevent the occurance of an accident.

DESCRIPTION OF THE PREFERRED EMBODIMENT

Figure 1:
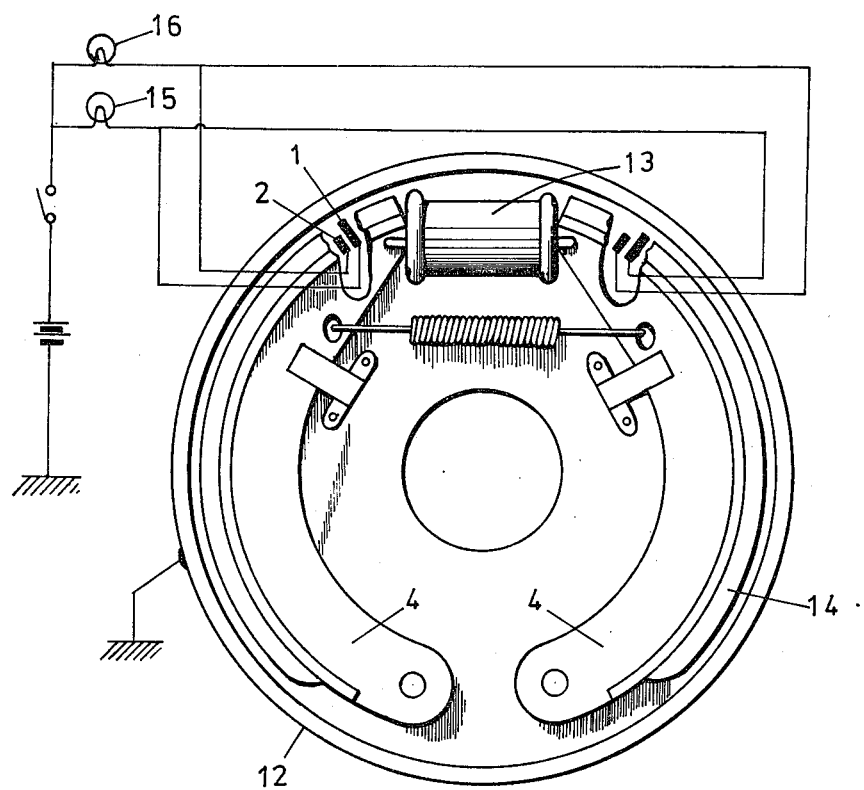
FIG. 1 is a diagram showing the safety indication circuit of a braking system, a power source, indicators, and the longer and shorter conductor bars.
Figure 3:
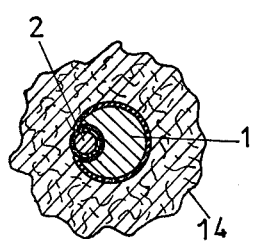
FIG. 3 is a sectional view along lines 2—2 of FIG. 2.
Figure 2:
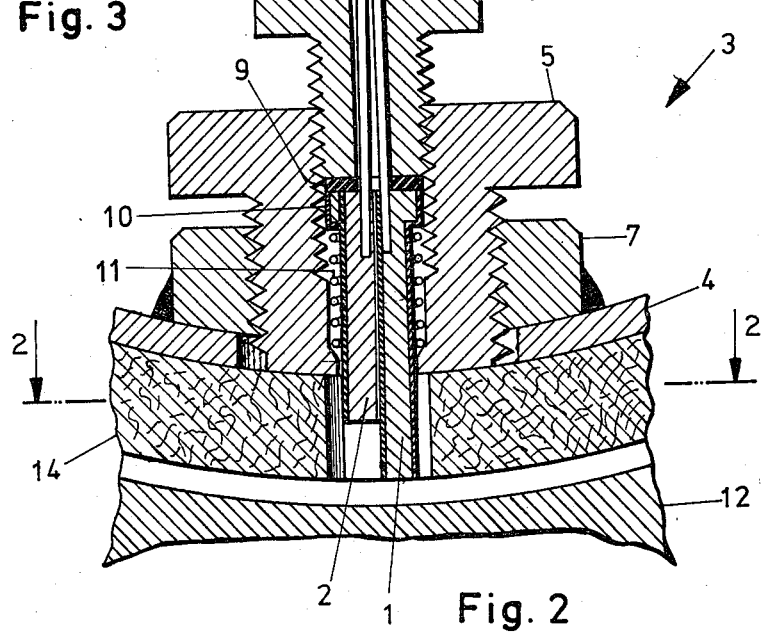
FIG. 2 is a local magnification of Part 3 in FIG. 1, showing the installation of longer and shorter conductor bars in the brake drum.

Contacting conductor comprises a flanged longer conductor bar (1) and a shorter conductor bar (2). Both bars are made of carbon with a high thermal resistant insulating material (e.g. mica) coating. The shorter conductor bar is fixed to the flanged longer conductor bar (1) by means of an adhesive bond and enclosed in the brake lining with a depth of ⅜-182 of the thickness of lining measured from the working face of the lining.

Conductor base (3) is, principally, fixed on the basic body (5) of brake shoe (4) and the adjusting screw (6) for fixing and positioning the longer conductor bar. In case fixing on basic body (5) is impossible because of an insufficient thickness of brake shoe (4), a nut (7) can be soldered on the brake shoe. An insulative washer (9) allows the passage of two conducting wires, and a flange (10) supports the longer conductor bar (1) and is against the adjusting screw 6 installed between the longer conductor bar (1) and adjusting screw (6).

The conducting wires (8) are two coded with different colors. A terminal of one is connected to the longer conductor bar (1) and the other to the shorter conductor bar (2) respectively and the other terminals are connected to the indicators respectively.

As shown in FIG. 1, the two respective terminals from the indicators are joined in series to the positive pole of a battery. When the brake pedal is pressed, the longer conductor bar (1) and brake drum (12) institute a closed circuit. An indicator (15) (for instance, yellow bulb) will light provided the bulb, circuit, insulation and connecting joints are perfect and the braking system is in normal condition. In case the braking system is abnormal, the bulb will not light, and this phenomenon indicates the following conditions and repair should be done forthwith: breakdown of a main oil hydraulic cylinder (wear on its jacket or wall), leakage of an oil pipe or breakdown of the auxiliary oil hydraulic cylinder (wear on its jacket or wall). In case the indicator does not extinquish after the release of the brake pedal, then there may be rust on the wall of the auxiliary oil hydraulic cylinder or blockage of the piston which should then be replaced, or an improper adjustment to the gap adjustment screw has occurred (e.g. the gap is to large), or the unreturnable piston should be removed for readjustment. If the brake lining is worn to a certain degree, the shorter conductor bar (2) will contact the brake drum and constitute a closed circuit when the brake pedal is pressed. Then, the indicator (for instance, yellow bulb) lights and shows the necessity of lining replacement.

Having thus described the preferred embodiment of the invention it should be understood that numerous structural modifications and adaptations may be resorted to without departing from the spirit of the invention.

We claim:

1. An indicator for a braking system which utilizes a lining affixed to a support shoe comprising: a first conductor bar embedded within the lining and supported by the shoe, said first conductor bar has a terminal portion flush with the brake lining, insulation means electrically isolating said conductor bar from the shoe, a conductor wire leading from said conductor bar to a bulb, a source of power connected to said bulb and connected to a ground, and a ground on a surface against which the lining acts while applying a braking force whereby when said conductor bar touches said surface, the bulb will be illuminated, a second conductor bar shorter than said first conductor bar and fastened thereto such that said first conductor bar will provide a first indication, a second conductor wire connected to said second conductor and to a second bulb which is connected to said source of power whereby said first indication shows that the brakes do work, and the second conductor bar shows lining wear said first and second conductor bars are carried in said lining by means of a base member surrounding said bars defined by a body fastened to said shoe, an adjusting screw threadedly disposed within said body, an insulative washer below said adjusting screw, said bar members are below said washer and are provided with a flange which abuts against said washer whereby the adjusting screw orients said conducting bars.

* * * * *